(12) United States Patent
Takeuchi

(10) Patent No.: US 12,275,372 B2
(45) Date of Patent: Apr. 15, 2025

(54) CONTROL APPARATUS, CONTROL METHOD, AND STORAGE MEDIUM

(71) Applicant: HONDA MOTOR CO., LTD., Tokyo (JP)

(72) Inventor: Yuji Takeuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 112 days.

(21) Appl. No.: 18/239,905

(22) Filed: Aug. 30, 2023

(65) Prior Publication Data

US 2024/0101067 A1 Mar. 28, 2024

(30) Foreign Application Priority Data

Sep. 28, 2022 (JP) ................................. 2022-155266

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *B60R 25/23* (2013.01); *B60R 25/33* (2013.01);
(Continued)

(58) Field of Classification Search
CPC ......... B60R 25/24; B60R 25/01; B60R 25/23; B60R 25/33; B60R 2325/103;
(Continued)

(56) References Cited

U.S. PATENT DOCUMENTS 7,162,347 B2 1/2007 Shibamori et al.
7,729,815 B2 6/2010 Watanabe et al.
(Continued)

FOREIGN PATENT DOCUMENTS

JP 2003-067871 A 3/2003
JP 2003-206554 A 7/2003
(Continued)

OTHER PUBLICATIONS

Office Action dated Mar. 18, 2024, issued in counterpart JP Application No. 2022-155266, with English translation. (6 pages).

*Primary Examiner* — An T Nguyen
(74) *Attorney, Agent, or Firm* — WHDA, LLP

(57) ABSTRACT

There is provided with a control apparatus. A first obtaining unit obtains position information of a vehicle. A setting unit sets a remote operation permitted range of the vehicle on a basis of movement information of the vehicle in a first predetermined period based on the position information. A second obtaining unit obtains information indicating that a specific operation for a remote operation input to the vehicle from a user terminal is performed. A controlling unit restricts the remote operation input from the user terminal to the vehicle in a case where a position of the vehicle at a time of obtaining the information is outside the remote operation permitted range. The movement information includes the position information of the vehicle and a visit situation to the position in the first predetermined period.

18 Claims, 9 Drawing Sheets

(51) Int. Cl.
  *B60R 25/23* (2013.01)
  *B60R 25/33* (2013.01)
  *G07C 9/00* (2020.01)

(52) U.S. Cl.
  CPC .... *G07C 9/00309* (2013.01); *B60R 2325/103* (2013.01); *B60R 2325/205* (2013.01); *G07C 2009/00793* (2013.01); *G07C 2209/63* (2013.01)

(58) Field of Classification Search
  CPC .......... B60R 2325/205; G07C 9/00309; G07C 2009/00793; G07C 2209/63
  See application file for complete search history.

(56) References Cited

U.S. PATENT DOCUMENTS

| | | | |
|---|---|---|---|
| 10,173,585 B1* | 1/2019 | Rrumbullaku | ........ G01S 13/931 |
| 2004/0236489 A1 | 11/2004 | Shibamori et al. | |
| 2014/0159866 A1* | 6/2014 | Hwang | .................. G08C 17/02 |
| | | | 340/5.64 |
| 2015/0298655 A1* | 10/2015 | Monthel | ................. B60R 25/24 |
| | | | 701/2 |
| 2021/0331710 A1* | 10/2021 | Moriya | .................. G05D 1/227 |
| 2021/0370868 A1* | 12/2021 | Sakurada | ................ B60R 25/24 |
| 2022/0091606 A1* | 3/2022 | Nakagawa | ............. H04W 4/40 |
| 2022/0266797 A1* | 8/2022 | Katoh | ..................... B60R 25/24 |

FOREIGN PATENT DOCUMENTS

| | | |
|---|---|---|
| JP | 2004-312376 A | 11/2004 |
| JP | 2006-306191 A | 11/2006 |
| JP | 2009-059282 A | 3/2009 |
| JP | 4403985 B2 | 1/2010 |
| JP | 2010-256272 A | 11/2010 |
| KR | 20200052202 A | 5/2020 |

* cited by examiner

| USER ID 301 | VEHICLE ID 302 | STOP PERMISSION RANGE 303 | RESTRICTED STATE 304 | EXPIRATION DATE 305 | ... |
|---|---|---|---|---|---|
| A0001 | C0001 | XX.XX,YY.YY | True | 2022/11/03 | ... |
| A0002 | C0002 | XX.XX,YY.YY | False | 2022/09/21 | ... |
| A0003 | C0001 | XX.XX,YY.YY | True | 2022/10/10 | ... |
| A0004 | C0003 | XX.XX,YY.YY | False | 2022/11/09 | ... |
| A0005 | C0004 | XX.XX,YY.YY | True | 2022/11/06 | ... |
| A0006 | C0004 | XX.XX,YY.YY | False | 2022/10/12 | ... |
| A0007 | C0005 | XX.XX,YY.YY | True | 2022/10/21 | ... |
| A0008 | C0006 | XX.XX,YY.YY | False | 2022/09/25 | ... |

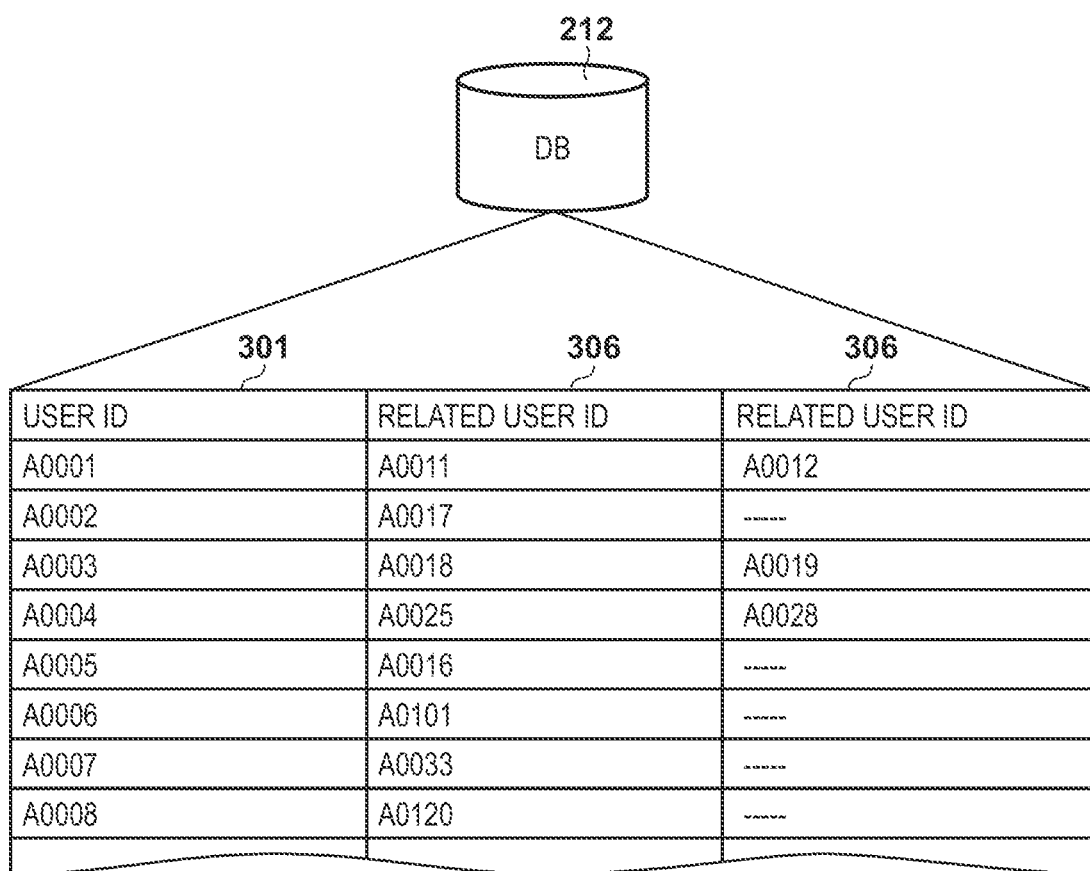

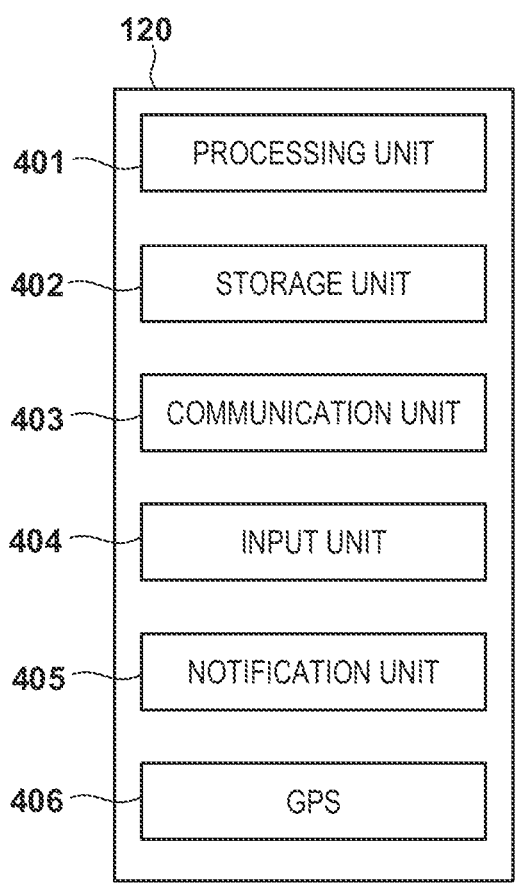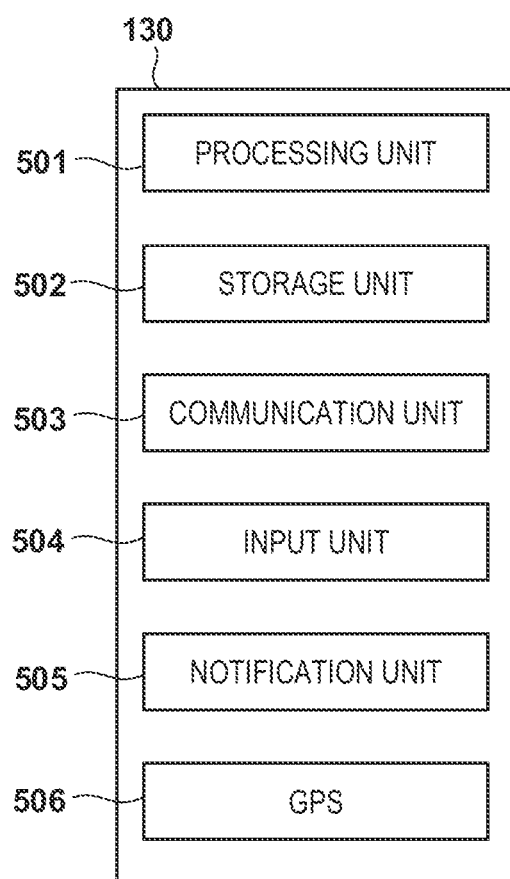

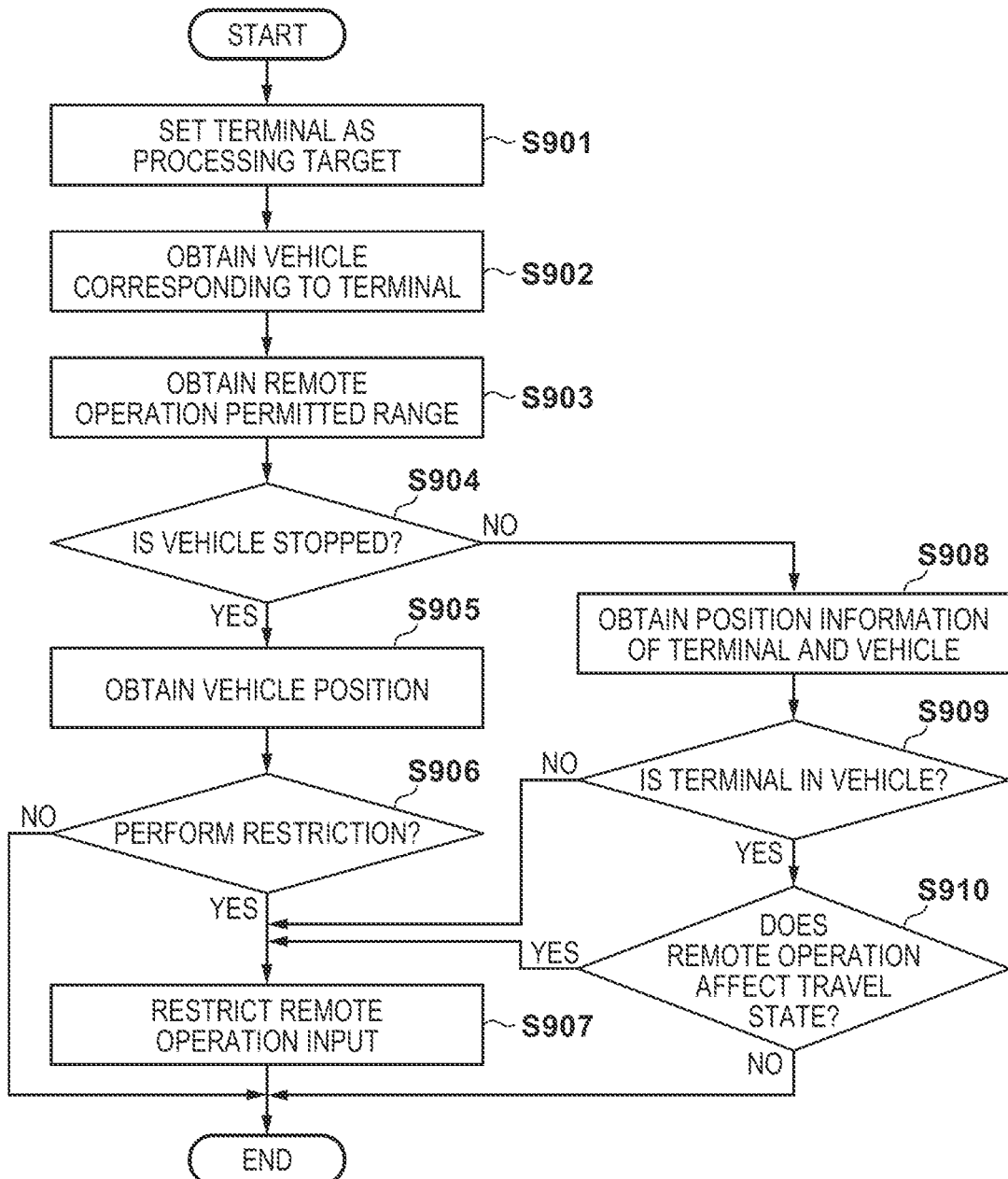

CONTROL APPARATUS, CONTROL METHOD, AND STORAGE MEDIUM

CROSS-REFERENCE TO RELATED APPLICATION(S)

This application claims priority to and the benefit of Japanese Patent Application No. 2022-155266 filed on Sep. 28, 2022, the entire disclosure of which is incorporated herein by reference.

BACKGROUND OF THE INVENTION

Field of the Invention

The present invention relates to a control apparatus, a control method, and a storage medium.

Description of the Related Art

Conventionally, a device and a system that cause a vehicle to execute a requested operation in response to a remote operation request of a vehicle user are known. Japanese Patent No. 4403985 discloses a technique for determining whether or not to permit a remote operation based on a parking position so that an inappropriate remote operation is not executed in light of a current situation of a vehicle.

SUMMARY OF THE INVENTION

According to one embodiment of the present disclosure, a control apparatus, comprises: a first obtaining unit configured to obtain position information of a vehicle; a setting unit configured to set a remote operation permitted range of the vehicle on a basis of movement information of the vehicle in a first predetermined period based on the position information; a second obtaining unit configured to obtain information indicating that a specific operation for a remote operation input to the vehicle from a user terminal is performed; and a controlling unit configured to restrict the remote operation input from the user terminal to the vehicle in a case where a position of the vehicle at a time of obtaining the information is outside the remote operation permitted range, wherein the movement information includes the position information of the vehicle and a visit situation to the position in the first predetermined period.

According to another embodiment of the present disclosure, a control method, comprises: obtaining position information of a vehicle; setting a remote operation permitted range of the vehicle on a basis of movement information of the vehicle in a first predetermined period based on the position information; obtaining information indicating that a specific operation for a remote operation input to the vehicle from a user terminal is performed; and restricting the remote operation input from the user terminal to the vehicle in a case where a position of the vehicle at a time of obtaining the information is outside the remote operation permitted range, wherein the movement information includes the position information of the vehicle and a visit situation to the position in the first predetermined period.

According to yet another embodiment of the present disclosure, a non-transitory computer-readable storage medium storing a program which, when executed by a computer comprising a processor and a memory, causes the computer to: obtain position information of a vehicle; set a remote operation permitted range of the vehicle on a basis of movement information of the vehicle in a first predetermined period based on the position information; obtain information indicating that a specific operation for a remote operation input to the vehicle from a user terminal is performed; and restrict the remote operation input from the user terminal to the vehicle in a case where a position of the vehicle at a time of obtaining the information is outside the remote operation permitted range, wherein the movement information includes the position information of the vehicle and a visit situation to the position in the first predetermined period.

BRIEF DESCRIPTION OF THE DRAWINGS

FIG. 3B is a diagram illustrating an example of data stored in the database;

FIG. 4 is a diagram illustrating an example of a hardware configuration of an in-vehicle device of a vehicle;

FIG. 5 is a diagram illustrating an example of a hardware configuration of a user terminal;

FIG. 9 is a flowchart illustrating an example of a restriction process of a remote operation input according to an embodiment;

DESCRIPTION OF THE EMBODIMENTS

Figure 1:
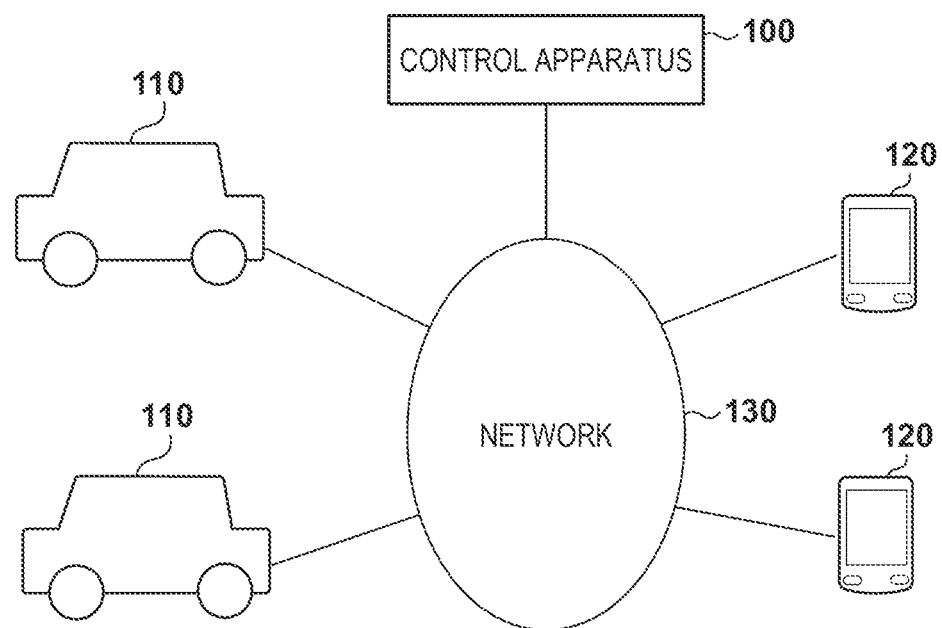
FIG. 1 is a diagram illustrating an example of a system configuration for providing a remote operation service of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

The technique described in Japanese Patent No. 4403985 has a problem that, in a case where the ownership of a vehicle is transferred to another person by a malicious user, for example, reselling of the vehicle, the authority of remote control remains in the original user.

Therefore, an embodiment of the present invention makes it possible to properly limit the authority of the remote operation of the vehicle. Further, the embodiment of the present invention also makes it possible to give particular consideration to the needs of vulnerable people, women, children, disabled people, and the elderly, and to provide all people with access to a sustainable transportation system that is safe, inexpensive, and easily available by improving traffic safety through expansion of public transportation, and the like.

A control apparatus according to the embodiment of the present invention obtains position information of a vehicle, and sets a remote operation permitted range of the vehicle on the basis of movement information of the vehicle in a first predetermined period based on the position information. Next, the control apparatus obtains information indicating that a specific operation for a remote operation input to the vehicle from a user terminal is performed, and restricts the remote operation input from the user terminal to the vehicle in a case where the position information of the vehicle at the time of obtaining the information is outside the remote operation permitted range. Here, the movement information includes the position information of the vehicle and a visit situation to the position in the first predetermined period. This control apparatus is particularly used for remote control of a vehicle. In the present embodiment, the description will be given assuming that the control apparatus is a server that communicates with the vehicle and the user terminal, but this is an example, and the configuration is not limited as long as similar control can be performed such as performing a part of the function by an in-vehicle device, for example.

System

FIG. 1 is a system diagram illustrating an example of a configuration of a remote operation service for remotely operating a vehicle 110 including a control apparatus 100 according to the present embodiment. The control apparatus 100 according to the present embodiment is a server as described above, and is communicably connected to the vehicle 110 and the user terminal 120 via the network 130. In the example of FIG. 1, one vehicle 110 and one user terminal 120 are illustrated, but the number of these is not particularly limited. Note that, hereinafter, the in-vehicle device of the vehicle is also referred to as a "vehicle".

In the remote operation service according to the present embodiment, the control apparatus 100 controls the vehicle 110 on the basis of a remote operation input in the user terminal 120. In the present embodiment, there is an associated user terminal associated with each of vehicles 110, and the vehicle 110 is controlled by the remote operation input to the associated user terminal.

Figure 7:
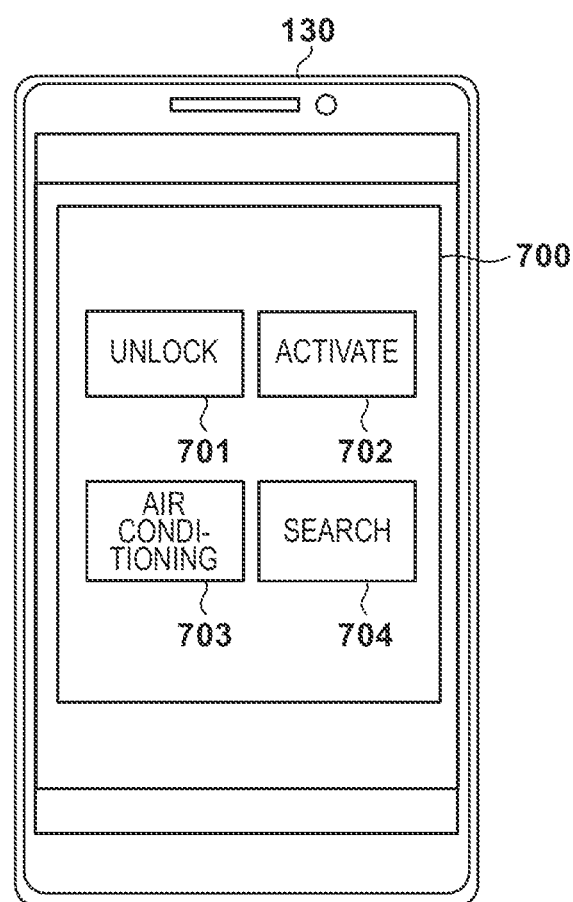
FIG. 7 is a diagram illustrating an example of a GUI in the user terminal when the remote operation service is executed.

As the remote operation input, for example, unlocking of the vehicle 110 or (power supply) activation of the vehicle is performed, but the remote operation input is not particularly limited thereto. For example, the user terminal 120 may receive, as the remote operation input, an operation of control of an in-vehicle device such as activation of an air conditioner or control for making it easier to find a vehicle (for example, turning on the light) by a GUI as illustrated in FIG. 7 to be described later, or may receive the remote operation input related to another function in the vehicle 110. In the present embodiment, it is assumed that the user terminal 120 receives the remote operation input by the user via a dedicated application for controlling the remote operation service, and the control apparatus 100 controls the vehicle 110 via the network 130. Hereinafter, when simply referred to as an "application", it is assumed to refer to the application that controls the remote operation service described above.

An operation example in the application according to the present embodiment will be described. The control apparatus 100 according to the present embodiment associates the vehicle 110 with the user terminal 120. Here, when the vehicle 110 is started, the identification information is displayed on a display unit inside the vehicle 110, and when the user terminal 120 receives the input of the identification information, the vehicle 110 and the user terminal 120 are associated with each other. As the identification information, for example, a personal identification number (PIN) code represented by a four-digit number is used. The vehicle 110 performs various operations such as door unlocking or power activation in response to the remote operation input via the application in the user terminal 120.

Note that, in the present embodiment, the control apparatus 100 controls the vehicle 110 on the basis of the remote operation input in the user terminal 120, but the user terminal 120 may directly communicate with the vehicle 110 to perform some or all of the control. The user terminal 120 is connected to the vehicle 110 by, for example, near field communication, and can control the vehicle 110. For example, when the user terminal 120 and the vehicle 110 are associated with each other by inputting identification information to the user terminal for the first time, the control apparatus 100 controls the vehicle 110. Next, for the remote operation such as unlocking of the vehicle 110 for a predetermined period (for example, 2 months) after the user terminal 120 and the vehicle 110 are associated with each other, communication of remote operation may be performed from the user terminal 120 to the vehicle 110 without going through the control apparatus 100. In this case, when the control apparatus 100 restricts the remote operation input from the user terminal 120 by processing to be described later, the control apparatus 100 restricts the communication of the remote operation by the near field communication from the user terminal 120 to the vehicle 110.

Although the vehicle 110 is described as a four-wheeled automobile in the present embodiment, for example, a vehicle of a different form such as a two-wheeled straddle type vehicle may be used as the vehicle 110. The user terminal 120 is, for example, a portable terminal such as a smartphone, and receives an input by the user including the remote operation input. The user terminal 120 according to the present embodiment can have a function as a digital key that unlocks the vehicle 110 by input via the application.

Figure 2:
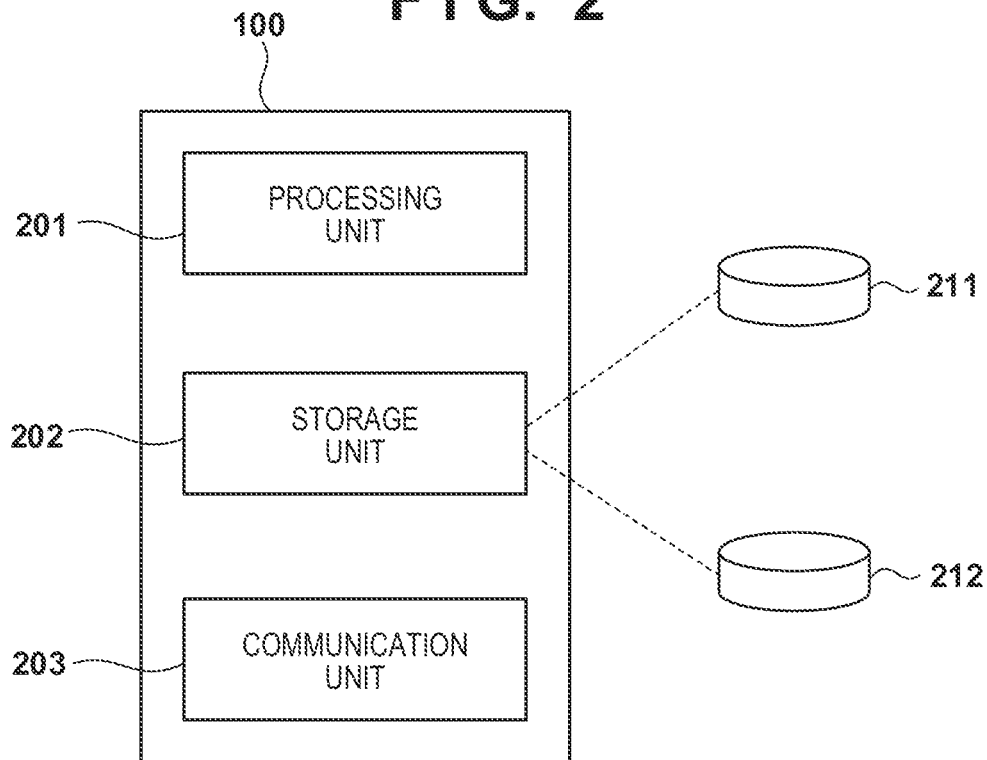
FIG. 2 is a diagram illustrating an example of a configuration of a control apparatus.

FIG. 2 is a block diagram illustrating an example of a hardware configuration of the control apparatus 100 according to the present embodiment. The control apparatus 100 includes a processing unit 201, a storage unit 202, and a communication unit 203. The processing unit 201 is a processor represented by a CPU, and executes a program stored in the storage unit 202. The storage unit 202 is a storage device such as a RAM, a ROM, or a hard disk. The communication unit 203 includes a wired or wireless communication interface capable of communicating with the vehicle 110 or the user terminal 120 via a communication network.

Figure 3A:
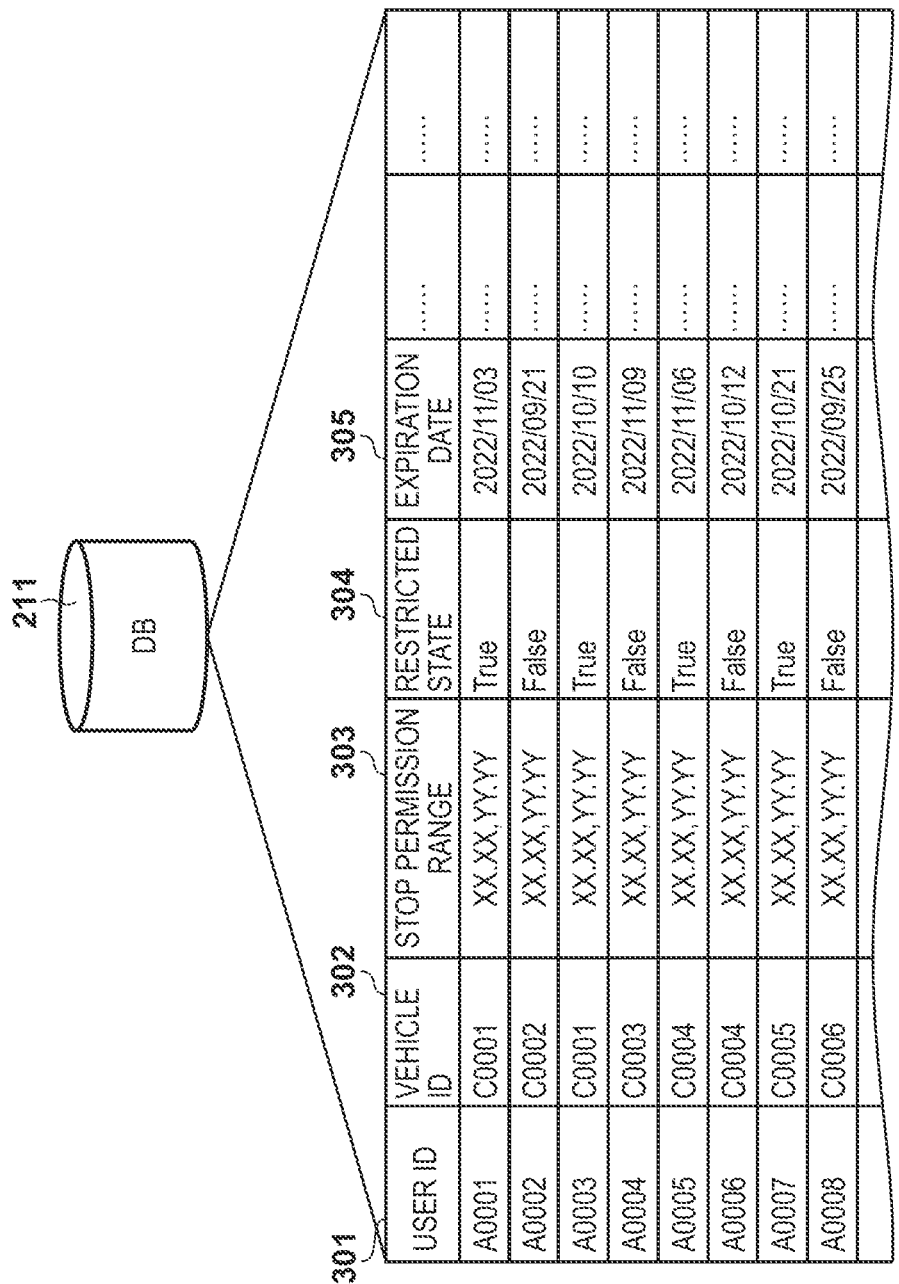
FIG. 3A is a diagram illustrating an example of data stored in a database.

The storage unit 202 stores various data in addition to the program executed by the processing unit 201. The program may be installed in the control apparatus 100 from a storage medium such as a CD-ROM. In the example of FIG. 2, a database (DB) 211 to 212 is illustrated as data to be stored in the storage unit 202. Here, the DB 211 is a database that stores information in which the vehicle and the associated user terminal are associated with each other. The DB 212 is a database that stores information indicating a user terminal and a user terminal associated (for example, registered as a family) with the user terminal. Note that the DB 211 and the DB 212 may be separate databases, or may be collectively one database. In the present embodiment, for convenience, the databases are described separately, but it is not limited that each database exists as a separate database. FIGS. 3A and 3B are diagrams simply illustrating these DBs.

A record for each user terminal 120 is accumulated in the DB 211, and the user terminal, each vehicle associated with the user terminal, and information on how long the association is maintained (expiration date) are registered together. Furthermore, in the present embodiment, the DB 211 stores, for each user terminal, information indicating the remote operation permitted range set for the user terminal, and information (restriction information) as to whether or not the remote operation input is restricted by the control apparatus 100. As illustrated in FIG. 3A, the record stored in the DB 211 includes a user ID 301 corresponding to a user terminal, a vehicle ID 302 corresponding to a vehicle, a remote operation permitted range 303, a restricted state 304, and an expiration date 305. Here, the remote operation permitted range 303 is indicated by coordinates serving as a center for setting the remote operation permitted range. In addition, although the expiration date 305 is stored as a date when the association between the vehicle 110 and the user terminal 120 is resolved, the expiration date may be expressed in another mode such as storing information indicating a remaining period. In addition, in the present embodiment, the remote operation permitted range is registered in association with each user terminal 120 (as the remote operation permitted range in the vehicle associated with the user terminal), but the remote operation permitted range may be registered in association with the vehicle 110.

A record for each user terminal 120 is accumulated in the DB 212, and the user terminal and the user terminal associated with the user terminal are registered together. As illustrated in FIG. 3B, the record stored in DB 212 includes the user ID 301 corresponding to the user terminal and a related user ID 306 associated with the associated user terminal. Here, a plurality of user terminals may be registered in one user terminal, and the number thereof is not limited. In addition, in the example of FIG. 3B, management is performed by registering associated user terminals for each user terminal, but information regarding similar association may be stored in the DB 212 by registering a series of groups of associated user terminals.

Note that the control apparatus 100 allocates the user ID to the user terminal 120 on the basis of information obtained by communication from the user terminal 120, but for example, an ID generated using information input by the user via the application or the like may be allocated as the user ID.

FIG. 4 is a block diagram illustrating an example of a hardware configuration of the in-vehicle device of the vehicle 110 according to the present embodiment. The vehicle 110 includes a processing unit 401, a storage unit 402, a communication unit 403, an input unit 404, a notification unit 405, and a global positioning system (GPS) sensor 406. The processing unit 401 is a processor, a typical example of which is a CPU, and executes a program stored in the storage unit 402. The storage unit 402 is a storage device such as a RAM or a ROM. Programs stored in the storage unit 402 also include the application program for using the service of the present embodiment.

The communication unit 403 is a communication device for communicating with an external device. The communication unit 403 includes, for example, a wireless communication device capable of communicating with the control apparatus 100 via the communication network. Furthermore, for example, the communication unit 403 includes a wireless communication device capable of communicating with the user terminal 120 via near field communication. The input unit 404 is a device that receives a user's input. The notification unit 405 is a notification device inside the vehicle 110, and notifies the user of information by display on a display, or the like, for example. In the present embodiment, the input unit 404 and the notification unit 405 may constitute a touch panel display, and may be operable by touch input, for example, may be operable by a mechanical switch, a dial, or the like. The GPS sensor 406 is a sensor that obtains vehicle position information indicating the current position of the vehicle 110, and the vehicle position information is transmitted to the control apparatus 100 via the communication unit 403. As described above, the notification unit 405 according to the present embodiment can give a notification of identification information such as a PIN code when the vehicle 110 is activated. This notification may be displayed on a display or may be a notification by voice, and a method thereof is not particularly limited as long as the user can be notified. In the following description, it is assumed that the notification unit 405 performs notification by display on the display.

Here, the notification unit 405 notifies the identification information in a case where the vehicle 110 is in the unlocked state. Note that notification of the identification information may be performed when the vehicle 110 is activated. First, in a case where the vehicle 110 is unlocked without via the user terminal 120 (for example, by a physical key) (before the user terminal 120 is registered to the vehicle 110), by notifying the user of the identification information by the notification device inside the vehicle 110, an appropriate (unlockable) user is notified of the identification information, and association between the vehicle 110 and the user terminal 120 can be appropriately performed as initial setting. In the present embodiment, when the input of the identification information displayed on the notification unit 405 in the user terminal is confirmed, the control apparatus 100 registers the user terminal as the associated user terminal associated with the vehicle 110 (for example, in the form illustrated in FIG. 3A). An example of display for inputting the identification information in the user terminal 120 will be described later with reference to FIG. 6A.

In addition, the communication unit 403 can detect the user terminal inside the vehicle 110 by near field communication. Here, the communication unit 403 may generate information (here, it is assumed to be indicated by a user ID) indicating the user terminal 120 present inside the vehicle 110 when the vehicle 110 is stopped and transmit the information to the control apparatus 100.

FIG. 5 is a block diagram illustrating an example of a hardware configuration of the user terminal 120 according to the present embodiment. Since the user terminal 120 basically includes each functional unit capable of executing a function similar to that of the vehicle 110, redundant description will be omitted.

The description will be given on the assumption that the position information (vehicle position information) of the vehicle 110 and the position information (terminal position information) of the user terminal 120 according to the present embodiment are information indicating a position with respect to map information obtained by a GPS sensor, and are obtained and updated at predetermined intervals. However, the control apparatus 100 may obtain each piece of the position information by a different procedure such as transmitting the position information of the vehicle 110 or the user terminal 120 to the control apparatus 100 by a device in an external facility, for example.

Remote Operation Service

Hereinafter, details of processing performed by the control apparatus 100 in the remote operation service according to the present embodiment will be described. The following processing is performed by the processing unit 201 of the control apparatus 100.

The control apparatus 100 obtains the position information of the vehicle 110, and sets the remote operation permitted range of the vehicle 110 on the basis of movement information of the vehicle 110 in a first predetermined period based on the position information. The remote operation permitted range according to the present embodiment is a range set to restrict the remote operation input from the user terminal 120 when the position of the vehicle 110 at the time of obtaining the information indicating that the specific operation is performed in the user terminal 120 is outside the remote operation permitted range, and details thereof will be described later. The first predetermined period according to the present embodiment can be arbitrarily set, but is assumed to be, for example, a predetermined number of days (such as the last 30 days). Here, the predetermined number of days (including the predetermined number of days in a second predetermined period described below) indicates an elapse exceeding a predetermined timing (for example, 0:00) in one day, that is, is calculated by the number of times of crossing a day, but one day may be calculated according to an elapse of 24 hours, and the number of days may be calculated by another calculation method as long as it is used as a guide of an elapse of the number of days.

The movement information of the vehicle 110 includes a visit situation to a certain position of the vehicle in a first predetermined period. Here, the visit situation includes the number of visits to a certain position of the vehicle 110 or a stop period. The control apparatus 100 according to the present embodiment may set, as the remote operation permitted range, for example, a range in which the stop period of the vehicle 110 is set on the basis of a position over the second predetermined period described below. Furthermore, for example, the control apparatus 100 may set, as the remote operation permitted range, a range set on the basis of a position where the number of visits (the number of stops) of the vehicle 110 is equal to or more than a predetermined number of times. Hereinafter, an example of a process of setting the remote operation permitted range by the control apparatus 100 will be described.

For example, the control apparatus 100 may set, as the remote operation permitted range, a range set on the basis of a position where the vehicle 110 is continuously stopped for the second predetermined period during the first predetermined period. In this case, the remote operation permitted range can be, for example, a predetermined range (for example, a radius of 100 meters) centered on a position where the vehicle is continuously stopped for the second predetermined period (in consideration of a shift in position information, a shift in stop position, and the like). The second predetermined period can be arbitrarily set as a predetermined number of days, for example, three days. Note that, here, the vehicle may stop at the same position in a case where the vehicle continues to be located at the same coordinates (a margin can be set) by the GPS sensor, or the vehicle may stop at the same position in a case where the vehicle continues to be located at the same facility (for example, a parking lot or the like) on the map.

Furthermore, for example, the control apparatus 100 may set, as the remote operation permitted range, a range set on the basis of a position where the number of times the vehicle stops (visits) in the first predetermined period is equal to or more than a predetermined number of times. In this case, the remote operation permitted range can be, for example, a predetermined range (for example, a radius of 100 meters) centered on a position where the number of times the activation of the vehicle is stopped in the first predetermined period is equal to or more than a predetermined number of times. Here, the predetermined number of times can be arbitrarily set according to a requirement required by the user of the control apparatus 100, for example, four times.

Furthermore, for example, the control apparatus 100 may obtain a region where the number of times of passage of the vehicle in the first predetermined period is equal to or more than a predetermined number of times, and set a predetermined range set on the basis of the region as the remote operation permitted range. In this case, for example, the control apparatus 100 may directly detect a region that has passed a predetermined number of times or more, or may detect a plurality of points that has passed a predetermined number of times or more and obtain a region that has passed a predetermined number of times or more on the basis of the plurality of points. Here, the remote operation permitted range may be, for example, a range obtained by adding a predetermined width (for example, 20 meters) around a region that has passed a predetermined number of times or more, or may be a region group of a predetermined range (for example, a radius of 100 meters) from each of points that has passed a predetermined number of times. The predetermined number of times here can also be arbitrarily set according to a requirement required by the user of the control apparatus 100, for example, four times.

Furthermore, for example, the control apparatus 100 may set, as the remote operation permitted range, a range set on the basis of a position where the number of times a specific operation for performing the remote operation input to the vehicle is performed in the user terminal 120 is equal to or more than a predetermined number of times in the first predetermined period. In this case, the remote operation permitted range can be, for example, a predetermined range (for example, a radius of 100 meters) centered on a position where the number of times the specific operation is performed in the first predetermined period is equal to or more than a predetermined number of times. The predetermined number of times here can also be arbitrarily set according to a requirement required by the user of the control apparatus 100, for example, four times. Note that the "specific operation" in the present embodiment is an operation for activating a user input including, for example, an operation of activating the application in the user terminal 120, an operation of logging in on the application, an operation of performing the remote operation input on the application, or the like.

The control apparatus 100 according to the present embodiment may set the remote operation permitted range on the basis of the position information of the vehicle and the position information of the user terminal in the first predetermined period. Here, the control apparatus 100 can set, as the remote operation permitted range to be actually used, a range obtained by adding the remote operation permitted range set on the basis of the position information of the user terminal in addition to the remote operation permitted range set on the basis of the position information of the vehicle in the first predetermined period as described above. Here, as the remote operation permitted range set on the basis of the position information of the user terminal, for example, a range set on the basis of a position where the number of times of execution of the specific operation is equal to or more than a predetermined number of times as described above can be used.

By setting the remote operation permitted range by such processing, a region frequently used by the vehicle is provided as the remote operation permitted range, and when an operation for performing the remote operation is input outside the region, it is possible to restrict the remote operation input as a possibility of abuse.

An update process of the remote operation permitted range is performed when a predetermined condition is satisfied. For example, in a case where a position where the vehicle 110 is stopped for a period equal to or more than a period in which the vehicle is stopped at a position used for setting the remote operation permitted range in the immediately preceding update is detected in the first predetermined period, the control apparatus 100 may update a range set using the newly detected position as a new remote operation permitted range. For example, in a case where the control apparatus 100 sets a range set on the basis of a position where the vehicle is continuously stopped for the second predetermined period during the first predetermined period as the remote operation permitted range, when a position where the vehicle 110 is stopped for the second predetermined period or more is newly detected, the control apparatus can update and set a predetermined range centered on the position as the next remote operation permitted range. Further, for example, in a case where the control apparatus 100 sets, as the remote operation permitted range, a range set on the basis of a position where the number of stops of the vehicle in the first predetermined period is equal to or more than a predetermined number of times, in a case where a position where the vehicle 110 stops for a predetermined number of times or more in the first predetermined period is newly detected, the control apparatus can update and set a predetermined range centered on the position as the next remote operation permitted range.

In addition, the update process of the remote operation permitted range may be performed every day, for example, or the remote operation permitted range may be updated every predetermined period (for example, one month). According to such a process, it is possible to set the remote operation permitted range so as to restrict the remote operation input when it continues to stop at a position deviated from the position where the stop frequency of the vehicle 110 is high.

Note that, in a case where the remote operation permitted range is updated, the control apparatus 100 may restrict the remote operation input until a predetermined operation is performed in the user terminal 120 associated with the vehicle. Here, when the remote operation permitted range is updated, the login state of the application in the user terminal 120 may be released, and the remote operation input may not be performed as the logout state until the login input is performed as the predetermined operation.

The update process of the remote operation permitted range may be a process of setting only a newly set remote operation permitted range as the next remote operation permitted range. In addition, the update process of the remote operation permitted range may be a process of setting all the remote operation permitted ranges newly set in the first predetermined period immediately before the current time point as the remote operation permitted ranges.

In addition, in a case where the login state is released for all the user terminals 120 associated with the vehicle 110 at the time of performing the update process, and logging-in is performed by the same user terminal as the user terminal 120 that has logged in at the time of performing the immediately preceding update process, both the previous remote operation permitted range and the new remote operation permitted range may be set as the updated remote operation permitted range. Furthermore, in a case where login is performed by a user terminal different from the user terminal 120 that has logged in at the time of performing the immediately preceding update process after the login state is released, only a new remote operation permitted range may be set as the updated remote operation permitted range.

The control apparatus 100 restricts the remote operation input from the user terminal 120 in a case where the position of the vehicle 110 at the time of obtaining the information indicating that the specific operation is performed is outside the remote operation permitted range. Here, it is assumed that the control apparatus 100 obtains information indicating that a specific operation is performed when an operation of activating the application on the user terminal 120, the operation of logging in on the application, or an operation of performing the remote operation input on the application is performed.

For example, the control apparatus 100 may restrict the remote operation input by invalidating the remote operation input from the user terminal 120. That is, in a case where the remote operation via the application is input in the user terminal 120, the control apparatus 100 may not transmit the content of the remote operation to the vehicle 110. Further, in a case where the remote operation input in the user terminal 120 is transmitted to the vehicle 110 by near field communication, the control apparatus 100 may prohibit the application of the user terminal 120 from transmitting the input to the vehicle 110, or may not execute the instruction even when the vehicle 110 receives the instruction.

Further, for example, the control apparatus 100 may restrict the remote operation input by stopping the remote operation input in the user terminal 120. That is, the control apparatus 100 may stop processing for performing remote operation input, such as login or activation of the application in the user terminal.

In addition, in a case where the remote operation input is performed while the vehicle 110 is traveling, it may be dangerous to execute the remote operation input. In particular, there is a particularly high possibility that the remote operation input from the user terminal 120 not present in the vehicle 110 does not conform to the driving situation of the traveling vehicle 110. From such a viewpoint, in a case where the remote operation input from the user terminal 120 not present in the vehicle 110 is input while the vehicle 110 is traveling, the control apparatus 100 may restrict the remote operation input.

Further, for example, even in a case where the remote operation input is performed while the vehicle 110 is traveling, when the remote operation input is performed by the user terminal 120 present in the vehicle 110, there is a possibility that the remote operation input is the remote operation input according to the driving situation of the traveling vehicle 110. Therefore, in a case where the remote operation input from the user terminal 120 present in the vehicle is input while the vehicle 110 is traveling, the control apparatus 100 may determine whether or not to restrict the remote operation input according to the type of the remote operation input. For example, in a case where the remote operation input that is input during traveling is the remote operation input related to a function that affects the traveling state of the vehicle 110, the control apparatus 100 restricts the remote operation input. The function that affects the traveling state is, for example, unlocking of the vehicle 110, on/off of a defroster, opening/closing of a window, or the like. On the other hand, in a case where the remote operation input that is input during traveling is the remote operation input related to a function that does not affect the traveling state, the control apparatus 100 does not restrict the remote operation input accordingly. The function that does not affect the traveling state is a function that does not directly affect traveling, such as on/off of air conditioning, reproduction of music or a moving image, or on/off of a seat heater. These functions are merely examples, and settings may be made as to whether or not each function affects/does not affect the traveling state according to the determination of the designer of the application. For example, the adjustment of air conditioning may be a function of affecting the traveling state. In this manner, by restricting the remote operation input related to the function that affects the traveling state of the vehicle 110 input during traveling of the vehicle, it is possible to prevent the traveling from being affected and danger from occurring. In addition, in a case where the remote operation input that is input during such traveling is restricted, the operation is rejected without causing the user terminal 120 to log out, so that it is possible to omit time and effort for performing login again and improve convenience.

Figure 6A:
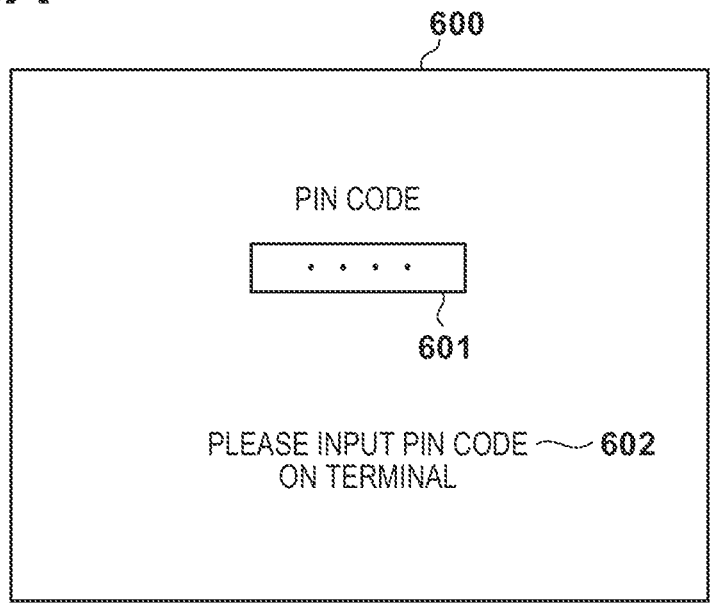
FIG. 6A is a diagram illustrating an example of a GUI for initial setting in the vehicle and the user terminal.
Figure 6B:
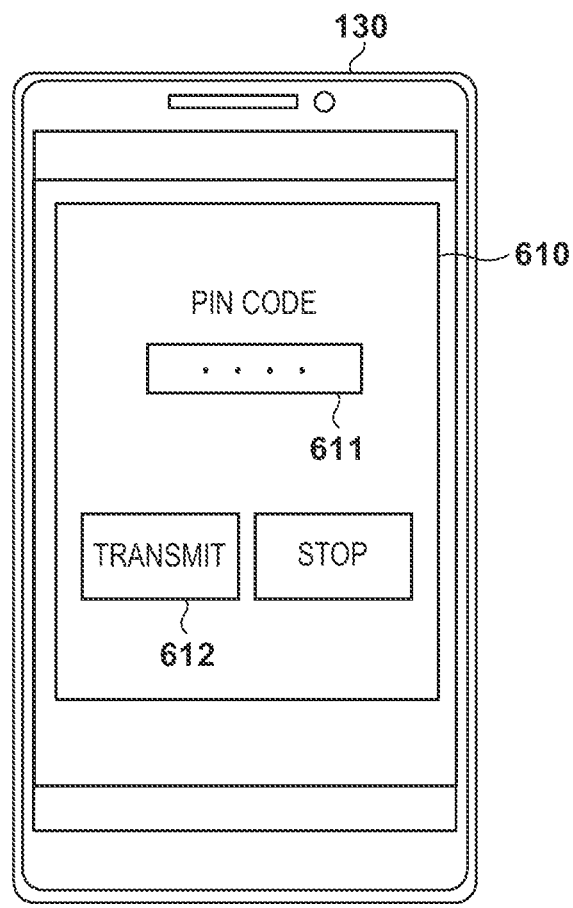
FIG. 6B is a diagram illustrating an example of the GUI for initial setting in the vehicle and the user terminal.

FIGS. 6A, 6B, and 7 are diagrams illustrating examples of GUIs displayed on the vehicle 110 and the user terminal 120 according to the present embodiment. FIGS. 6A and 6B display, as initial settings, examples of GUIs displayed for inputting identification information notified by the notification unit 405 of the vehicle 110 to the user terminal 120. FIG. 6A illustrates an example of a screen 610 for displaying a PIN code on a display that is the notification unit 405 of the vehicle 110, and FIG. 6B illustrates an example of a screen 600 for inputting a PIN code on the user terminal 120.

A screen 600 is a screen displayed when the vehicle 110 is unlocked, and a PIN code 601 and a message 602 are displayed. When the input of the PIN code by the user terminal 120 is confirmed, the notification of the identification information ends, and the display shifts to normal display. Here, since the notification unit 405 is a display of an in-vehicle device, it is assumed that when the screen 600 ends, the screen is switched to a general display screen such as a car navigation screen or a music playback management screen.

A screen 610 is an input screen of a PIN code displayed when the application is activated (Particularly, at the time of initial start-up), and an input frame 611 of the PIN code and a transmission button 612 of the PIN code are displayed. By completing the input of the PIN code, association between the vehicle 110 and the user terminal 120 is performed, and information as illustrated in FIG. 3A is recorded in the database.

FIG. 7 is a diagram illustrating an example of a GUI on the user terminal 120 for performing the remote operation input after the association between the vehicle 110 and the user terminal 120 is completed. In FIG. 7, buttons corresponding to the respective remote operations are displayed on a screen 700, and an instruction of the remote operation is transmitted to the vehicle 110 (via the control apparatus 100) by the user's input. The screen 700 displays an unlocking button 701 for unlocking the vehicle 110, an activation button 702 for activating the vehicle, an air conditioning button 703 for activating air conditioning (air conditioner), and a search button 704 for making it easier to find a vehicle.

When the unlocking button 701 is pressed by the user, the vehicle 110 is unlocked. In a case where the vehicle 110 is in the unlocked state, the unlocking button 701 may be changed to a lock button (not illustrated) for locking the vehicle 110. Further, when the activation button 702 is pressed by the user, the power of the vehicle shifts to an on state (for example, an ignition power-on state). By turning on the power source of the vehicle, the user can drive the vehicle 110.

When the air conditioning button 703 is pressed by the user, the air conditioner of the vehicle 110 is activated. In response to the pressing of the air conditioning button 703, the user terminal 120 may shift the screen 700 to a guide screen (not illustrated) that performs air conditioning control such as air conditioner temperature setting or air volume control. In addition, when the user presses the search button 704, control is performed to change the state of the vehicle 110 so that the user can easily search for the vehicle 110. Here, it is assumed that the light of the vehicle 110 blinks for a predetermined period (for example, 15 seconds) in response to the pressing of the search button 704, but the state of the vehicle 110 may be changed in another manner such as outputting a voice from a speaker of the vehicle 110.

Note that, from the viewpoint of improving security, when a predetermined button such as the activation button 702 is pressed, an authentication code may be displayed on the notification unit 405 of the vehicle, and an instruction corresponding to the pressed button may be transmitted to the vehicle 110 by inputting the authentication code to the user terminal.

In addition, the screen 700 may display other information of buttons for performing remote operations as described above. For example, the user terminal 120 may display information indicating remaining fuel and a cruising distance of the vehicle 110, may display information indicating whether or not the vehicle 110 is in an unlocked state, or may display a temperature (or outside temperature) inside the vehicle 110. Note that the user terminal 120 does not need to display all the remote control buttons illustrated in the screen 700, and may be able to perform remote control only for a function desired by the designer of the application. In addition, it is not necessary to display all the buttons on one screen as in the screen 700, and an object including each button may be arranged in a plurality of screens in a distributed manner.

Figure 10A:
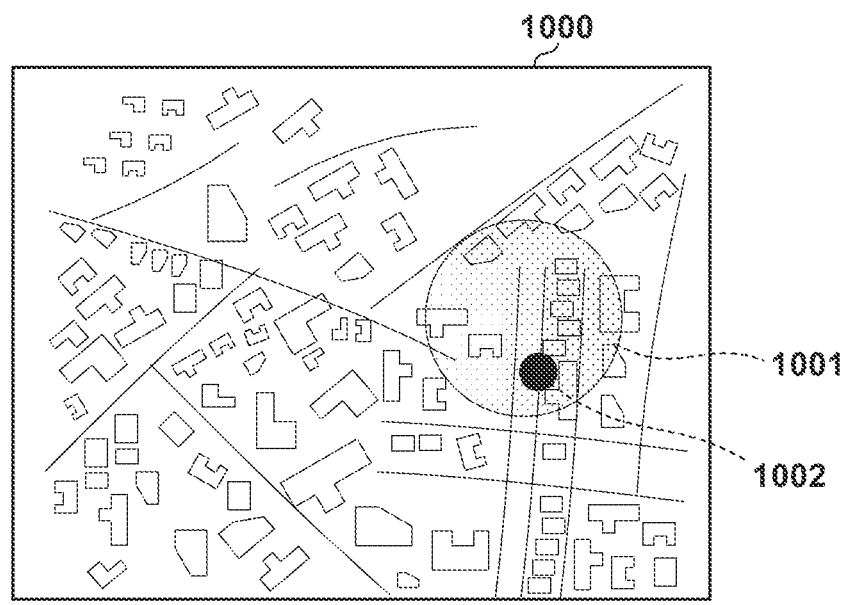
FIG. 10A is a diagram for describing a position state of the vehicle when restricting the remote operation input.
Figure 10B:
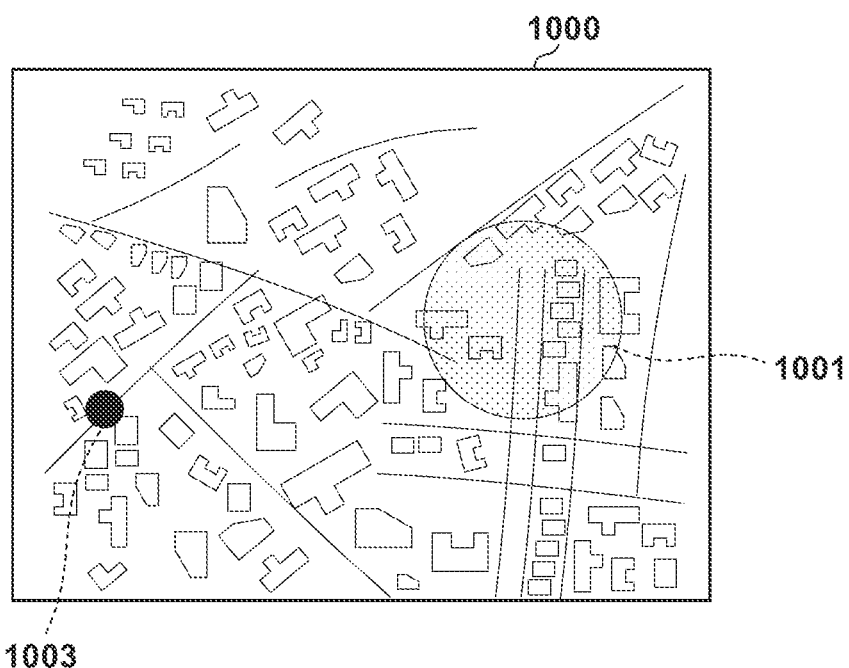
FIG. 10B is a diagram for describing a position state of the vehicle when restricting the remote operation input.

FIGS. 10A and 10B are diagrams for describing control processing according to the remote operation permitted range and the vehicle position by the remote operation service according to the present embodiment. In FIGS. 10A and 10B, the control apparatus 100 sets the remote operation permitted range 1001 on the map 1000 on the basis of the movement information of the vehicle.

In FIG. 10A, the stop position 1002 based on the position information of the vehicle is detected, and the stop position 1002 is within the remote operation permitted range 1001. Even when the vehicle is present at the stop position 1002 for the first predetermined period, the remote operation input is not restricted because the stop position is within the remote operation permitted range 1001.

On the other hand, in FIG. 10B, the stop position 1003 based on the position information of the vehicle is detected, and the stop position 1003 is out of the range of the remote operation permitted range 1001. In a case where the vehicle is present at the stop position 1003 for the first predetermined period, the control apparatus 100 according to the present embodiment restricts the remote operation input assuming that the vehicle may be used for abuse such as resale.

Figure 8:
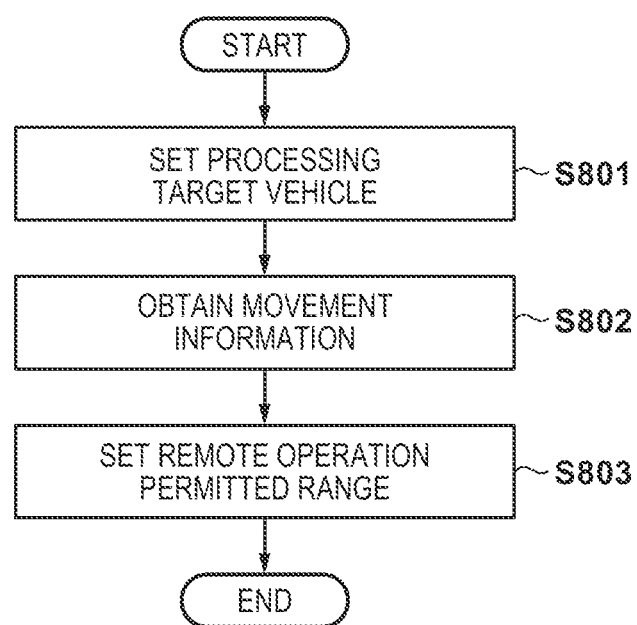
FIG. 8 is a flowchart illustrating an example of a remote operation permitted range setting process according to an embodiment.

Hereinafter, an example of processing in which the control apparatus 100 restricts the remote operation input to the user terminal as a processing target in the remote operation service according to the present embodiment will be described with reference to FIGS. 8 and 9. FIG. 8 is a flowchart illustrating an example of a process of setting the remote operation permitted range by the control apparatus 100. In S801, the control apparatus 100 sets the vehicle 110 as a processing target for setting the remote operation permitted range. Here, for example, the control apparatus 100 may set the vehicle 110 as a processing target by satisfying a predetermined condition for updating the remote operation permitted range, or may randomly set one of the vehicles registered in the DB 211 as a processing target, and a setting method of the processing target is not particularly limited.

In S802, the control apparatus 100 obtains movement information of the processing target vehicle 110 in the first predetermined period. Here, as the movement information, a movement history of the vehicle 110 in the first predetermined period may be stored in the DB 211, and information such as information indicating a position where the vehicle 110 has been continuously stopped for the second predetermined period may be stored in the DB 211. In S803, the control apparatus 100 sets (here, updates) the remote operation permitted range on the basis of the information obtained in S801, and terminates the processing. The update process described above is performed, and the description thereof is omitted here. Here, the control apparatus 100 may additionally obtain the position information of the user terminal 120 in S802, and set the remote operation permitted range in S803 based on the obtained position information.

FIG. 9 is a flowchart illustrating an example of a process of setting the remote operation permitted range according to the present embodiment, executed by the processing unit 401 of the control apparatus 100. When the process according to FIG. 9 ends and an unrestricted remote operation input is input, an instruction is transmitted to the vehicle 110 to execute the remote operation.

In step S901, the control apparatus 100 sets the user terminal 120 as a processing target for determining whether or not to restrict the remote operation input. Here, the control apparatus 100 sets the user terminal 120 that has transmitted the information indicating that the specific operation is performed to the control apparatus 100 as the processing target, but the method of setting the user terminal to be the processing target in S901 is not particularly limited, such as setting the user terminal present inside the vehicle 110 when the vehicle 110 is stopped as the processing target, for example. For example, the control apparatus 100 may randomly set one of the user terminals registered in the DB 211 as the processing target.

In S902, the control apparatus 100 refers to the DB 211 and obtains information indicating the vehicle 110 associated with the user terminal 120 as the processing target. In S903, the control apparatus 100 obtains the remote operation permitted range for the vehicle 110 for which the information is obtained in S902. Here, since the remote operation permitted range is set in the processing illustrated in FIG. 8 and stored in the DB 211, the control apparatus 100 refers to the DB 211 to obtain the remote operation permitted range.

In S904, the control apparatus 100 decides whether or not the vehicle is stopped. Here, the control apparatus 100 can decide whether or not the vehicle is stopped by obtaining information of whether or not the power of the vehicle is on from the vehicle 110. If the vehicle is stopped, the process proceeds to S905, and if not, the process proceeds to S908.

In S905, the control apparatus 100 obtains the current position of the vehicle 110. Here, the control apparatus 100 can set the position of the vehicle 110 at the time of the last power stop as the current stop position, but may obtain the current position information from the vehicle 110. Further, the control apparatus 100 may store the position information in association with the vehicle 110 in the DB 211, and refer to the information in S906.

In S906, the control apparatus 100 determines whether or not to restrict the remote operation input from the user terminal 120 on the basis of the remote operation permitted range set in S903 and the current position information of the vehicle 110 obtained in S905. Here, the control apparatus 100 does not restrict the remote operation input when the position of the vehicle is within the remote operation permitted range, or otherwise restricts the remote operation input. When the remote operation input is not restricted, the process ends, and when the remote operation input is restricted, the process proceeds to S907.

In S907, the control apparatus 100 restricts the remote operation input for the user terminal 120 as the processing target. Here, the control apparatus 100 restricts the remote operation input by disabling the remote operation input from the user terminal 120 or stopping the input of the remote operation in the user terminal. In the present embodiment, the remote operation input may be restricted only for the user terminal 120 as the processing target, or the remote operation input may be restricted for all the user terminals associated with the vehicle 110 corresponding to the user terminal 120 as the processing target. When S907 ends, the process ends.

In S908, the control apparatus 100 obtains information indicating whether or not the user terminal 120 as the processing target exists in the vehicle 110. Here, it is assumed that the user terminal 120 exists in the vehicle 110 in a case where the vehicle 110 and the user terminal 120 can communicate with each other by near field communication, or otherwise does not exist in the vehicle 110. In S909, the control apparatus 100 decides whether or not the user terminal 120 is present in the vehicle 110 on the basis of the information obtained in S908. If the user terminal 120 is present in the vehicle 110, the process proceeds to S910, and if not, the process proceeds to S907.

In step S910, the control apparatus 100 decides whether or not the remote operation input that is input by the user terminal 120 is an input of the remote operation related to a function that affects the traveling state of the vehicle 110. In a case where it is the input of the remote operation related to a function that affects the traveling state, the processing proceeds to S907, or otherwise, the processing ends.

With such a configuration, it is possible to set the remote operation permitted range on the basis of the position information of the vehicle 110 and determine whether or not to restrict the remote operation input from the user terminal 120 on the basis of the stop position of the vehicle 110 and the remote operation permitted range. In particular, in a case where a specific input for remotely operating the vehicle is made when the stop position is outside the remote operation permitted range, the remote operation input from the user terminal 120 to the vehicle 110 can be restricted. Therefore, even when resale of the vehicle 110 is performed by a malicious user, for example, it is possible to prevent the right of remote control from remaining in the original user.

Note that, in a case where the user terminals are associated with each other as illustrated in the database 212, when the remote operation input is restricted by one of the user terminals, it is conceivable that it is more efficient to restrict the remote operation input by all the user terminals of the associated group. Therefore, when determining to restrict the remote operation input in a certain user terminal, the control apparatus 100 may further restrict the remote operation input from the user terminal associated with the user terminal. By performing such processing, in a case where the remote operation input is restricted due to a possibility that a certain user has resold the product or the like, it is possible to collectively restrict the remote operation input also for the user terminals registered as those of a familiar user such as a family of the user. Therefore, it is possible to more efficiently manage the restriction of the remote operation.

Note that, in the present embodiment, the stop permission range is set on the basis of the movement information of the vehicle 110, but for example, it is also conceivable to stop the vehicle 110 at a position where parking is performed for a plurality of days even in normal use such as an airport, for example. From such a viewpoint, the control apparatus 100 may set the vehicle stop permitted range so as to exclude the predetermined range based on the map information. The predetermined range based on the map information is, for example, a region such as a facility where the user is assumed to keep the vehicle stopped on the map for a long period of time, such as an airport or a port, and can be arbitrarily set by the designer of the application.

In addition, even in a case where parking is performed outside the remote operation permitted range, it is also conceivable that the vehicle is only temporarily stopped and not resold. From such a viewpoint, the control apparatus 100 may obtain the position of the user terminal present inside the vehicle 110 after getting off the vehicle, and may not restrict the remote operation input by the user terminal in a case where the position continues to be within the predetermined range from the vehicle 110.

Further, in a case where the user has a key capable of unlocking the vehicle 110 without using the user terminal 120, the user having the user terminal 120 is considered to be an authorized user of the vehicle 110. Therefore, the control apparatus 100 may decide whether or not the user terminal 120 and the above-described key can communicate with each other (for example, by near field communication), and may determine that the remote operation input is not restricted in a case where the communication is possible.

Furthermore, in the present embodiment, the remote operation input is restricted when the position of the vehicle is outside the remote operation permitted range, but there may be a case where the position information of the vehicle at that time cannot be obtained due to a communication problem or the like. In such a case, the control apparatus 100 may use, instead of the position of the vehicle 110, the position information of the user terminal present in the vehicle obtained at the same timing. In addition, in a case where the vehicle 110 is connected to, for example, a charging station or an external facility such as Wifi or external device, position information obtained on the basis of the external facility or the external device may be used as the position information of the vehicle 110.

Note that, in the present embodiment, whether or not the remote operation input is restricted is determined on the basis of the position information of the vehicle when the specific operation is performed, that is, when the remote operation is performed. Therefore, for example, in a case where the vehicle 110 in the ignition power-off state is transported out of the remote operation permitted range by a tow truck or the like, and then the remote operation input is performed after the vehicle 110 returns to the remote operation permitted range, the remote operation input is not restricted.

In addition, for example, in a case where the vehicle 110 is used as a share car, it is conceivable that a user other than the main owner cannot input the remote operation, the vehicle 110 is unlocked by the physical key, and the vehicle stops outside the stop permission range that is regularly used by the main owner. Even in this case, the remote operation input is not restricted due to that the remote operation input is performed by the main owner after the user finishes using the vehicle and returns the vehicle 110 to the stop permission range.

Summary of Embodiments

The above embodiment discloses at least the following control apparatus, control method, and program.

1. A control apparatus (100) according to the above embodiment, comprises:
   a first obtaining unit (203) configured to obtain position information of a vehicle;
   a setting unit (201) configured to set a remote operation permitted range of the vehicle on a basis of movement information of the vehicle in a first predetermined period based on the position information;
   a second obtaining unit (203) configured to obtain information indicating that a specific operation for a remote operation input to the vehicle from a user terminal is performed; and
   a controlling unit (201) configured to restrict the remote operation input from the user terminal to the vehicle in a case where a position of the vehicle at a time of obtaining the information is outside the remote operation permitted range, wherein
   the movement information includes the position information of the vehicle and a visit situation to the position in the first predetermined period.

According to this embodiment, it is possible to appropriately restrict the authority to remotely operate the vehicle.

2. In the control apparatus according to the above embodiment,
   a third obtaining unit is configured to obtain position information of the user terminal, wherein
   the setting unit sets the remote operation permitted range on a basis of position information of the vehicle and position information of the user terminal in the first predetermined period.

According to this embodiment, it is possible to set the remote operation permitted range on the basis of both the position of the vehicle and the position of the user terminal.

3. In the control apparatus according to the above embodiment,
   a notifying unit is configured to causes a notification unit inside the vehicle to notify identification information in a case where the vehicle is in an unlocked state; and
   a registering unit is configured to register the user terminal as an associated user terminal associated with the vehicle in a case where input of the identification information in the user terminal is confirmed.

According to this embodiment, it is possible to register a user terminal associated with a vehicle for a user who can unlock without using the remote operation when performing initial setting or the like.

4. In the control apparatus according to the above embodiment, the setting unit sets the remote operation permitted range for the vehicle associated with the user terminal for each of user terminals.

According to this embodiment, it is possible to determine whether or not the remote operation input in the user terminal is restricted on the basis of the remote operation permitted range set for each user terminal.

5. In the control apparatus according to the above embodiment, the setting unit sets the remote operation permitted range to a predetermined range centered on a position where the vehicle is continuously stopped for the second predetermined period during the first predetermined period.

According to this embodiment, it is possible to restrict the remote operation input when the stop position of the vehicle continues to deviate from the normally assumed range.

6. In the control apparatus according to the above embodiment, the second predetermined period is a predetermined number of days, and the predetermined number of days is calculated by a number of times of crossing a day.

According to this embodiment, it is possible to evaluate the stop period of the vehicle according to the number of times of crossing the day.

7. In the control apparatus according to the above embodiment, the setting unit sets the remote operation permitted range to a predetermined range centered on a position where a number of stops in the first predetermined period is equal to or more than a predetermined number of times.

According to this embodiment, it is possible to evaluate the stop period of the vehicle according to the number of stops of the vehicle.

8. In the control apparatus according to the above embodiment, the setting unit sets the remote operation permitted range to a predetermined range set on a basis of a region where a number of times of passage in the first predetermined period is equal to or more than a predetermined number of times.

According to this embodiment, it is possible to evaluate the stop period of the vehicle according to the number of stops of the vehicle.

9. In the control apparatus according to the above embodiment, the setting unit sets the remote operation permitted range to a predetermined range set on a basis of a region in which a number of times the specific operation from the user terminal is performed by the user terminal is equal to or more than a predetermined number of times in a first predetermined period.

According to this embodiment, it is possible to set a region frequently used by the user as the remote operation permitted range.

10. In the control apparatus according to the above embodiment, the specific operation includes an operation of activating an application for performing a remote operation input to the vehicle, or an operation of inputting a remote operation to the vehicle in the application.

According to this embodiment, it is possible to determine whether or not to restrict the remote operation input according to the operation for performing the input by the application in the user terminal.

11. In the control apparatus according to the above embodiment, the setting unit sets the remote operation permitted range in such a manner as to exclude a predetermined range based on map information.

According to this embodiment, it is possible to avoid unnecessarily restricting the remote operation input when the vehicle stops in a predetermined range where long-term parking is assumed even in normal use, such as an airport.

12. In the control apparatus according to the above embodiment,
a deciding unit is configured to decide whether or not the user terminal and a key capable of unlocking the vehicle are communicable, wherein
the controlling unit does not restrict the remote operation input in a case where the deciding unit decides that the user terminal and the key capable of unlocking the vehicle are communicable.

According to this embodiment, in a case where it is decided that the user terminal is a terminal possessed by an authorized user of the vehicle, it is possible to determine that the remote operation input is not restricted.

13. In the control apparatus according to the above embodiment,
a fourth obtaining unit is configured to obtain information indicating whether or not the user terminal is present in the vehicle, wherein
the controlling unit restricts the remote operation input in a case where a remote operation input from the user terminal that is not present in the vehicle is input while the vehicle is traveling.

According to this embodiment, it is possible to restrict the remote operation input that is input from the outside of the vehicle while the vehicle is traveling, and to ensure safety.

14. In the control apparatus according to the above embodiment,
a fourth obtaining unit is configured to obtain information indicating whether or not the user terminal is present in the vehicle, wherein
the controlling unit determines whether or not to restrict the remote operation input according to a type of the remote operation input in a case where the remote operation input from the user terminal present in the vehicle is input while the vehicle is traveling.

According to this embodiment, it is possible to determine whether or not to restrict an input of the remote operation input that is input from the inside of the vehicle during traveling of the vehicle depending on whether or not the input affects traveling.

15. In the control apparatus according to the above embodiment, wherein the controlling unit restricts the remote operation input in a case where the remote operation input is an input of a remote operation related to a function that affects a traveling state of the vehicle.

According to this embodiment, it is possible to restrict input of a remote operation that affects the traveling state of the vehicle and to improve safety.

16. In the control apparatus according to the above embodiment, in a case where it is not possible to obtain the position information of the vehicle from the vehicle, the first obtaining unit obtains the position information of the user terminal that has performed the specific operation as the position information of the vehicle.

According to this embodiment, it is possible to substitute the position information of the user in a case where the position of the vehicle cannot be obtained.

17. A control method according to the above embodiment, comprises:
obtaining position information of a vehicle;
setting a remote operation permitted range of the vehicle on a basis of movement information of the vehicle in a first predetermined period based on the position information;
obtaining information indicating that a specific operation for a remote operation input to the vehicle from a user terminal is performed; and
restricting the remote operation input from the user terminal to the vehicle in a case where a position of the vehicle at a time of obtaining the information is outside the remote operation permitted range, wherein the movement information includes the position information of the vehicle and a visit situation to the position in the first predetermined period.

According to this embodiment, it is possible to appropriately restrict the authority to remotely operate the vehicle.

18. A non-transitory computer-readable storage medium according to the above embodiment, causes a computer to:
obtain position information of a vehicle;
set a remote operation permitted range of the vehicle on a basis of movement information of the vehicle in a first predetermined period based on the position information;
obtain information indicating that a specific operation for a remote operation input to the vehicle from a user terminal is performed; and
restrict the remote operation input from the user terminal to the vehicle in a case where a position of the vehicle at a time of obtaining the information is outside the remote operation permitted range, wherein
the movement information includes the position information of the vehicle and a visit situation to the position in the first predetermined period.

According to this embodiment, it is possible to appropriately restrict the authority to remotely operate the vehicle.

The embodiments of the invention have been described above, but The invention is not limited to the foregoing embodiments, and various variations/changes are possible within the spirit of the invention.

What is claimed is:

1. A control apparatus, comprising:
a first obtaining unit configured to obtain position information of a vehicle;
a setting unit configured to set a remote operation permitted range of the vehicle on a basis of movement information of the vehicle in a first predetermined period based on the position information;
a second obtaining unit configured to obtain information indicating that a specific operation for a remote operation input to the vehicle from a user terminal is performed; and
a controlling unit configured to restrict the remote operation input from the user terminal to the vehicle in a case where a position of the vehicle at a time of obtaining the information is outside the remote operation permitted range, wherein
the movement information includes the position information of the vehicle and a visit situation to the position in the first predetermined period.

2. The control apparatus according to claim 1, further comprising:
a third obtaining unit configured to obtain position information of the user terminal, wherein
the setting unit sets the remote operation permitted range on a basis of position information of the vehicle and position information of the user terminal in the first predetermined period.

3. The control apparatus according to claim 1, further comprising:
a notifying unit configured to causes a notification unit inside the vehicle to notify identification information in a case where the vehicle is in an unlocked state; and
a registering unit configured to register the user terminal as an associated user terminal associated with the vehicle in a case where input of the identification information in the user terminal is confirmed.

4. The control apparatus according to claim 1, wherein the setting unit sets the remote operation permitted range for the vehicle associated with the user terminal for each of user terminals.

5. The control apparatus according to claim 1, wherein the setting unit sets the remote operation permitted range to a predetermined range centered on a position where the vehicle is continuously stopped for the second predetermined period during the first predetermined period.

6. The control apparatus according to claim 5, wherein the second predetermined period is a predetermined number of days, and the predetermined number of days is calculated by a number of times of crossing a day.

7. The control apparatus according to claim 1, wherein the setting unit sets the remote operation permitted range to a predetermined range centered on a position where a number of stops in the first predetermined period is equal to or more than a predetermined number of times.

8. The control apparatus according to claim 1, wherein the setting unit sets the remote operation permitted range to a predetermined range set on a basis of a region where a number of times of passage in the first predetermined period is equal to or more than a predetermined number of times.

9. The control apparatus according to claim 1, wherein the setting unit sets the remote operation permitted range to a predetermined range set on a basis of a region in which a number of times the specific operation from the user terminal is performed by the user terminal is equal to or more than a predetermined number of times in a first predetermined period.

10. The control apparatus according to claim 1, wherein the specific operation includes an operation of activating an application for performing a remote operation input to the vehicle, or an operation of inputting a remote operation to the vehicle in the application.

11. The control apparatus according to claim 1, wherein the setting unit sets the remote operation permitted range in such a manner as to exclude a predetermined range based on map information.

12. The control apparatus according to claim 1, further comprising:
a deciding unit configured to decide whether or not the user terminal and a key capable of unlocking the vehicle are communicable, wherein
the controlling unit does not restrict the remote operation input in a case where the deciding unit decides that the user terminal and the key capable of unlocking the vehicle are communicable.

13. The control apparatus according to claim 1, further comprising:
a fourth obtaining unit configured to obtain information indicating whether or not the user terminal is present in the vehicle, wherein
the controlling unit restricts the remote operation input in a case where a remote operation input from the user terminal that is not present in the vehicle is input while the vehicle is traveling.

14. The control apparatus according to claim 1, further comprising:
a fourth obtaining unit configured to obtain information indicating whether or not the user terminal is present in the vehicle, wherein
the controlling unit determines whether or not to restrict the remote operation input according to a type of the remote operation input in a case where the remote operation input from the user terminal present in the vehicle is input while the vehicle is traveling.

15. The control apparatus according to claim 14, wherein the controlling unit restricts the remote operation input in a case where the remote operation input is an input of a remote operation related to a function that affects a traveling state of the vehicle.

16. The control apparatus according to claim 1, wherein in a case where it is not possible to obtain the position information of the vehicle from the vehicle, the first obtaining unit obtains the position information of the user terminal that has performed the specific operation as the position information of the vehicle.

17. A control method, comprising:
obtaining position information of a vehicle;
setting a remote operation permitted range of the vehicle on a basis of movement information of the vehicle in a first predetermined period based on the position information;
obtaining information indicating that a specific operation for a remote operation input to the vehicle from a user terminal is performed; and
restricting the remote operation input from the user terminal to the vehicle in a case where a position of the vehicle at a time of obtaining the information is outside the remote operation permitted range, wherein
the movement information includes the position information of the vehicle and a visit situation to the position in the first predetermined period.

18. A non-transitory computer-readable storage medium storing a program which, when executed by a computer comprising a processor and a memory, causes the computer to:
obtain position information of a vehicle;
set a remote operation permitted range of the vehicle on a basis of movement information of the vehicle in a first predetermined period based on the position information;
obtain information indicating that a specific operation for a remote operation input to the vehicle from a user terminal is performed; and
restrict the remote operation input from the user terminal to the vehicle in a case where a position of the vehicle at a time of obtaining the information is outside the remote operation permitted range, wherein
the movement information includes the position information of the vehicle and a visit situation to the position in the first predetermined period.

* * * * *